(12) United States Patent
Shaw

(10) Patent No.: US 12,539,369 B2
(45) Date of Patent: Feb. 3, 2026

(54) SYRINGE WITH MULTIFUNCTIONAL PLUNGER HANDLE

(71) Applicant: Thomas J. Shaw, Frisco, TX (US)

(72) Inventor: Thomas J. Shaw, Frisco, TX (US)

(73) Assignee: Retractable Technologies, Inc., Little Elm, TX (US)

( * ) Notice: Subject to any disclaimer, the term of this patent is extended or adjusted under 35 U.S.C. 154(b) by 304 days.

(21) Appl. No.: 17/403,385

(22) Filed: Aug. 16, 2021

(65) Prior Publication Data
US 2023/0052321 A1 Feb. 16, 2023

(51) Int. Cl.
A61M 5/315 (2006.01)
A61B 5/15 (2006.01)
A61B 5/153 (2006.01)
A61M 5/31 (2006.01)
A61M 5/32 (2006.01)

(52) U.S. Cl.
CPC ... *A61M 5/31513* (2013.01); *A61B 5/150236* (2013.01); *A61B 5/150755* (2013.01); *A61B 5/153* (2013.01); *A61M 5/3134* (2013.01); *A61M 5/3232* (2013.01); *A61M 2005/3131* (2013.01); *A61M 2005/31516* (2013.01)

(58) Field of Classification Search
CPC ............ A61M 5/31513; A61M 5/3134; A61M 5/3232; A61M 2005/3131; A61M 2005/31516; A61M 5/322; A61M 5/31511; A61M 5/3129; A61M 2005/323; A61B 5/150236; A61B 5/150755; A61B 5/153
See application file for complete search history.

(56) References Cited

U.S. PATENT DOCUMENTS

| | | |
|---|---|---|
| 3,978,846 A | 9/1976 | Bailey |
| 5,531,705 A | 7/1996 | Alter et al. |
| 5,814,017 A * | 9/1998 | Kashmer ............. A61M 5/50 604/110 |
| 6,015,438 A | 1/2000 | Shaw |
| 7,066,906 B2 | 6/2006 | Shue et al. |
| 7,285,110 B2 | 10/2007 | Fitzgerald |
| 7,947,020 B2 | 5/2011 | Thayer |
| 9,138,545 B2 | 9/2015 | Shaw |
| 9,814,841 B2 | 11/2017 | Shaw et al. |
| 9,931,475 B2 | 4/2018 | Shaw |

(Continued)

FOREIGN PATENT DOCUMENTS

| | | | | |
|---|---|---|---|---|
| GB | 2288982 A | * | 11/1995 | ........ A61M 5/31511 |
| WO | WO-2006044390 A2 | * | 4/2006 | .......... A61M 5/3234 |

(Continued)

*Primary Examiner* — Jennifer Robertson
*Assistant Examiner* — Om Patel
(74) *Attorney, Agent, or Firm* — Scheef & Stone, LLP; Robin L. Barnes; Mike Schofield

(57) ABSTRACT

A medical syringe useful for administering an injection or withdrawing a bodily fluid, the syringe comprising a barrel, plunger assembly and a needle assembly having a selectively retractable needle, the plunger assembly further comprising a plunger handle with a plunger seal and a front tip extending forwardly of the plunger seal to extend through the barrel and into the an annular fluid seal disposed in a recess between the barrel and a forwardly projecting needle, thereby reducing dead space inside the syringe and helping anchor the annular fluid seal inside the recess.

19 Claims, 3 Drawing Sheets

(56) References Cited

U.S. PATENT DOCUMENTS

| | | | |
|---|---|---|---|
| 9,956,352 B2 | 5/2018 | Shaw et al. | |
| D823,463 S | 7/2018 | Shaw et al. | |
| 11,103,642 B2 | 8/2021 | Tufts | |
| 11,202,863 B2 | 12/2021 | Tufts | |
| 12,161,851 B2 | 12/2024 | Shaw | |
| 2004/0024366 A1* | 2/2004 | Tsai | A61M 5/322 604/110 |
| 2004/0034322 A1 | 2/2004 | Lo | |
| 2007/0100291 A1 | 5/2007 | Huang et al. | |
| 2009/0018503 A1 | 1/2009 | Walton et al. | |
| 2009/0221962 A1 | 9/2009 | Kaal et al. | |
| 2009/0306601 A1 | 12/2009 | Shaw | |
| 2010/0034705 A1* | 2/2010 | Mundt | A61M 5/14216 422/400 |
| 2010/0049143 A1 | 2/2010 | D'Arrigo et al. | |
| 2013/0126559 A1* | 5/2013 | Cowan | A61M 5/31525 222/386 |
| 2014/0012206 A1* | 1/2014 | Shaw | A61B 5/150587 604/198 |
| 2014/0276445 A1* | 9/2014 | Shaw | A61M 5/345 604/198 |
| 2020/0001012 A1 | 1/2020 | Tufts | |

FOREIGN PATENT DOCUMENTS

| | | | |
|---|---|---|---|
| WO | 2019075396 | 4/2019 | |
| WO | WO-2020185393 A1 * | 9/2020 | A61B 5/15003 |

* cited by examiner

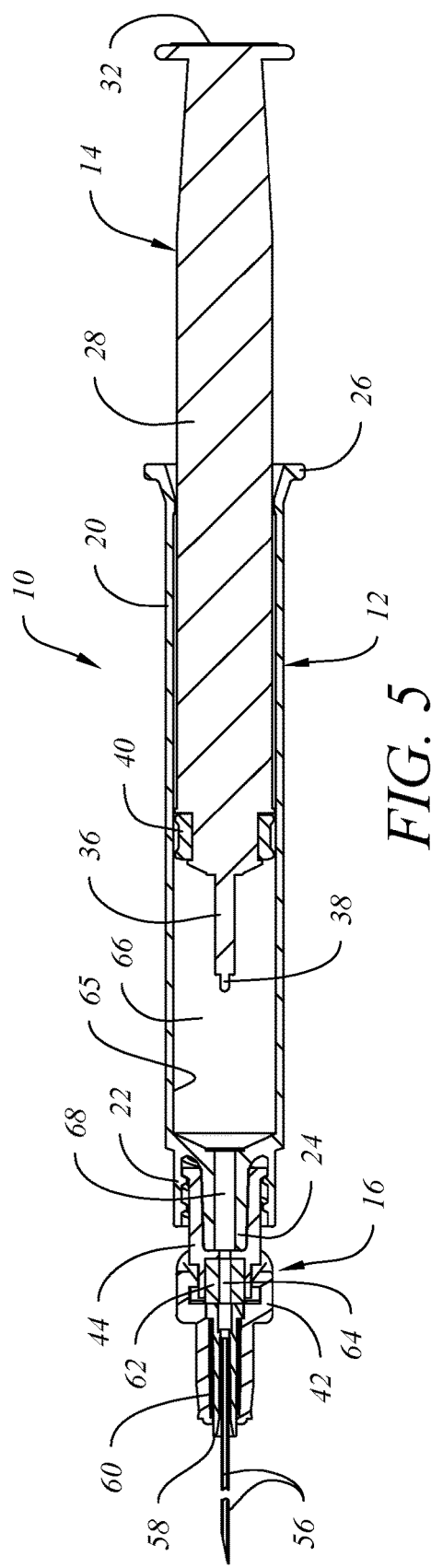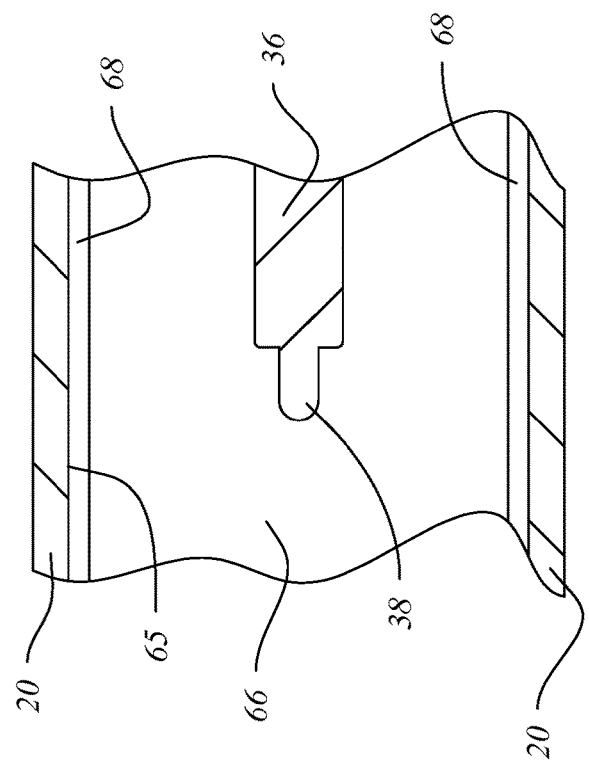
FIG. 5
FIG. 6

SYRINGE WITH MULTIFUNCTIONAL PLUNGER HANDLE

TECHNICAL FIELD

This invention relates to a medical syringe comprising a barrel with front and rear openings, a plunger insertable into the barrel through the rear opening, and a needle assembly that is releasably attachable to a front portion of the barrel. The subject syringe can be selectively configured for infusing medicinal fluids into a patient or port, or for drawing bodily fluids such as blood from a patient for subsequent testing or other purposes. More particularly, this invention relates to a medical syringe having a selectively retractable needle and a multifunctional plunger handle comprising a front tip that projects forwardly of the plunger seal and is configured to reduce the amountof dead space inside the syringe when the plungeris fully advanced inside the barrel during an injection. When the subject syringe is used for infusing medicines or vaccines, the reduction and virtual elimination of dead space inside this syringe and plunger configuration can in some situations beneficially increase the number of doses that can be drawn and administered to a patient from a single vial.

Another aspect of the invention is that a front tip projecting forwardly of the plunger seal the subject plunger handle is also desirably configured to project forwardly through and beyond the nose of the barrel, where it is guided into a coaxially aligned fluid flow path through an annular fluid seal disposed or seated in a recess disposed between the nose and the needle assembly to help anchor the fluid seal when the needle is repositioned laterally for retraction following use. The subject syringe is satisfactorily provided with a needle assembly having a needle retraction mechanism that is activated by lateral movement of the needle assembly relative to the annular fluid seal and toward an offset needle retraction chamber. During such lateral repositioning, the forwardly projecting front tip of the plunger handle also helps prevent fluid leakage between the front end of the annular fluid seal and a facing and contacting surface of the needle assembly. Following needle retraction, the fluid flow path into or out of the syringe barrel is blocked at the interface between the forwardly extending end of the annular fluid seal and a facing and contacting surface of the needle assembly.

Another aspect of the invention relates to a medical syringe having integrated needle retraction and fluid sealing features in combination with a plunger handle having a front tip extending forwardly of the plunger seal. When the subject invention is used for drawing blood, the plunger is advanced inside the barrel and the forwardly extending tip of the plungerhandle blocks a portion of the fluid flow path through the annular fluid seal and through the nose portion of the barrel prior to venipuncture. Following venipuncture, as the plunger is withdrawn inside the barrel to allow blood to flow into the fluid chamber ahead of the plunger seal, any air bubble formation is minimal due to the reduced dead space between the needle and the plunger seal. The subject invention can be provided and used without or in conjunction with a filter and can also include, for example, a coating of an anticoagulant such as Heparin disposed inside the barrel.

BACKGROUND

Syringes comprising a barrel, a plunger handle, an elastomeric plunger seal seated on the plunger handle and slidably engaging the inside wall of the barrel, and a forwardly projecting needle communicating through a fluid pathway with a fluid reservoir disposed inside the barrel are well known. When a medicinal fluid is drawn into the syringe and then discharged during an injection, a relatively small volume of fluid typically remains inside the fluid pathway through the syringe following the injection even though the plunger is fully depressed inside the barrel. The volume of fluid that remains inside a syringe following an injection is often referred to as "dead space." Depending upon the design, configuration and performance characteristics of a particular syringe barrel/plunger/needle combination, the amount of dead space inside a syringe can vary significantly and is desirably less than about 0.03 mL for a 3 ml syringe. Reducing the amount of dead space in the fluid delivery system of a syringe is desirable because it provides less room for the formation of air bubbles inside a syringe and can increase the number of doses of a medication that can be administered to patients out of a single vial. Reducing the amount of dead space inside a syringe has long been recognized as a desirable goal but has become an even greater consideration given the large volumes of vaccine that are being administered during the worldwide COVID-19 pandemic.

U.S. Pat. No. 9,814,841 discloses a prior art device bearing an attachable needle assembly that does not disclose the multifunctional plunger handle of this invention or the integrated fluid sealing and fluid seal anchoring functions provided here in combination with a needle assembly that is slidable laterally to achieve retraction of a used needle. EasyPoint® syringes utilizing lateral repositioning of a needle assembly relative to a needle retraction chamber are currently manufactured by and marketed through Retractable Technologies, Inc.

SUMMARY OF THE INVENTION

A medical syringe is disclosed that comprises coaxially aligned components including a barrel, plunger assembly, annular fluid seal and needle assembly that are cooperatively designed and integrated to reduce dead space, conserve medications, and control fluid leakage following injections while also protecting patients and healthcare workers from possible infection or contamination by accidental needlestick injuries. A principal feature of the invention is a plunger handle that is modified in relation to those disclosed in the prior art by an integrally molded front tip that projects forwardly past the plunger seal, through the nose of the barrel and into a longitudinally extending fluid pathway through an annular fluid seal seated between the nose of the barrel and the needle holder to help anchor the fluid seal relative to the syringe barrel during needle repositioning prior to needle retraction. In one satisfactory embodiment of the invention, the annular fluid seal engages a rearwardly facing surface of a slide member that is repositioned laterally to block the fluid pathway through the annularfluid seal following an injection and before the needle is biased into a needle retraction chamber offset laterally from the axial fluid pathway.

According to another satisfactory embodiment of the invention, a syringe is disclosed that comprises a syringe barrel, a plunger assembly having a plunger handle with a front tip of reduced diameter that projects forwardly of the plunger seal to displace more of an injectable fluid disposed inside the nose of the syringe barrel than would otherwise be displaced when the plunger handle is fully advanced inside the barrel. In 3 mL syringes comprising one preferred embodiment of the invention, dead space forwardly of the plunger seal is reduced to less than 0.025 mL and sometimes below 0.020 ml to as little as 0.018 mL or less. According to another satisfactory embodiment of the invention, a second portion of the front tip of the plunger handle has a diameter less than the diameter of the first portion and projects forwardly from the first portion of the front tip into a coaxially aligned passageway through an annular fluid seal disposed between the barrel and the needle assembly, thereby displacing more of an injectable fluid forwardly into and through the needle and also helping anchor the annular fluid seal against lateral movement relative to the syringe barrel during repositioning of the needle assembly prior to needled retraction.

A first portion of the front tip of the plunger handle desirably has an outside diameter slightly less than the inside diameter of the barrel tip to displace and expel fluid forwardly out of the barrel tip as the plunger advances forwardly inside the syringe barrel during an injection. The length of the first portion of the front tip of the plunger is desirably such that it extends through and reaches to or slightly past the front end of the barrel tip when the plunger handle is fully advanced inside the barrel. The front of the plunger handle is desirably configured to fit with minimal clearance inside the inside surface of the front portion of the barrel when the plunger handle is fully advanced inside the barrel so that the front of the plunger seal is abutting against a facing and cooperatively configured surface on the inside of the barrel. This displaces medicinal fluid from the barrel tip into the fluid pathway extending through the needle as the plunger seal is fully depressed into the nose end of the barrel. The forward movement of the first portion of the front tip of the plunger handle through the inside of the barrel tip also assists in guiding a coaxially aligned second, narrower and forwardly extending portion of the front tip into alignment with a rearwardly facing opening of a fluid pathway extending coaxially through an annular fluid seal disposed between the barrel tip and the rear end of the needle holder.

According to another satisfactory embodiment of the invention, a medical syringe is disclosed that comprises: a barrel having a cylindrical sidewall, a rear opening defined by oppositely disposed, radially extending finger flanges and an integrally formed, forwardly facing female-threaded luer connector with a coaxially aligned, tapered nose projecting forwardly inside the female-threaded luer connector; a plunger assembly further comprising a plunger handle insertable into the rear opening of the barrel, an elastomeric plunger seal slidably engaging an inwardly facing surface of the cylindrical barrel to define a fluid reservoir disposed between the tapered nose and the plunger seal; and a needle assembly selectively attachable to the barrel. The needle assembly satisfactorily further comprises a body, a rearwardly projecting chamber luer releasably attachable to the female-threaded luer connector, and a slide member that slidably engages both the body and the rearwardly projecting chamber luer. The slide member provides seating surfaces for a needle holder with a forwardly projecting needle and a compressed needle retraction spring disposed around a front portion of the needle holder. The female-threaded luer connector satisfactorily provides seating surfaces for an annular fluid seal disposed between the tapered nose of the barrel and the rearwardly facing surface of the needle holder. The body of the needle assembly further comprises a rearwardly extending needle retraction chamber having a forwardly facing open end that receives the needle holder, needle and expanded compression spring during needle retraction.

Prior to use of the subject medical syringe, the barrel, plunger assembly, chamber luer, annular fluid seal, needle holder and needle are all desirably coaxially aligned and cooperate to define a longitudinally extending fluid flow path through the syringe. The needle is desirably protected from inadvertent contamination, bending or dulling by a frictionally engageable needle cover that is removable prior to use of the device. When used for infusion, following removal of the needle cover, a medicinal fluid drawn into the fluid reservoir of the syringe from an external source such as a medicine vial is expelled through the front of the syringe by advancing the plunger assembly inside the barrel. When the plunger handle is fully advanced inside the barrel, a forwardly projecting front tip of the plunger handle extends through the nose of the barrel and into the rearwardly facing opening of the annular plunger seal to help anchor the seal while simultaneously displacing fluid forwardly through the needle holder and needle to reduce dead space. When used for withdrawing vascular fluids from a patient, a forwardly facing venipuncture needle is inserted into a patient and the plunger assembly is withdrawn rearwardly inside the barrel to allow the fluid to flow through the fluid flow path and into the fluid reservoir disposed forwardly of the plunger seal of the syringe. In this embodiment of the invention, the forwardly projecting front tip of the plunger handle helps reduce the likelihood of air bubble formation forwardly of the plunger seal.

Optionally, the open end of the needle retraction chamber is configured to receive a locking arm projecting rearwardly from a needle cover frictionally engaging the slide member to limit relative sliding movement between the slide member and body to prevent unintended (premature) needle retraction prior to use of the device for infusing or collecting fluids. It will also be apparent to those skilled in the art upon reading this disclosure that other similarly effective structures such can also be used for preventing or limiting unintentional, relative sliding movement between the slide member and the body of the needle assembly to prevent accidental needle retraction prior to use.

Following use of the subject syringe for either injecting or withdrawing fluids, the slide member is repositioned laterally relative to the barrel by the application of digital pressure to the transverse pad at the free end of the slide member move the needle holder and needle into alignment with the open end of the needle retraction chamber, whereupon the compressed retraction spring expands to drive the needle holder and needle into the needle retraction chamber. During this repositioning of the slide member relative to the barrel, a rearwardly facing surface of the slide member contacts and seals off a fluid flow path through the annular fluid seal to prevent fluid from leaking out the front of the barrel and possibly contaminating others.

BRIEF DESCRIPTION OF THE DRAWINGS

The apparatus of the invention is further described and explained in relation to the following figures of the drawings, wherein:

FIG. 5 is a cross-sectional view as in FIG. 2 but with the needle cover removed, a central portion of the needle broken away, and plunger handle moved rearwardly in relation to the barrel to show a fluid chamber disposed forwardly of the plunger inside the barrel; and FIG. 6 is an enlarged detail view showing a surface coating disposed on the inside wall of the barrel when the subject syringe is to be used, for example, for drawing blood.

DETAILED DESCRIPTION OF PREFERRED EMBODIMENTS

Figure 1:
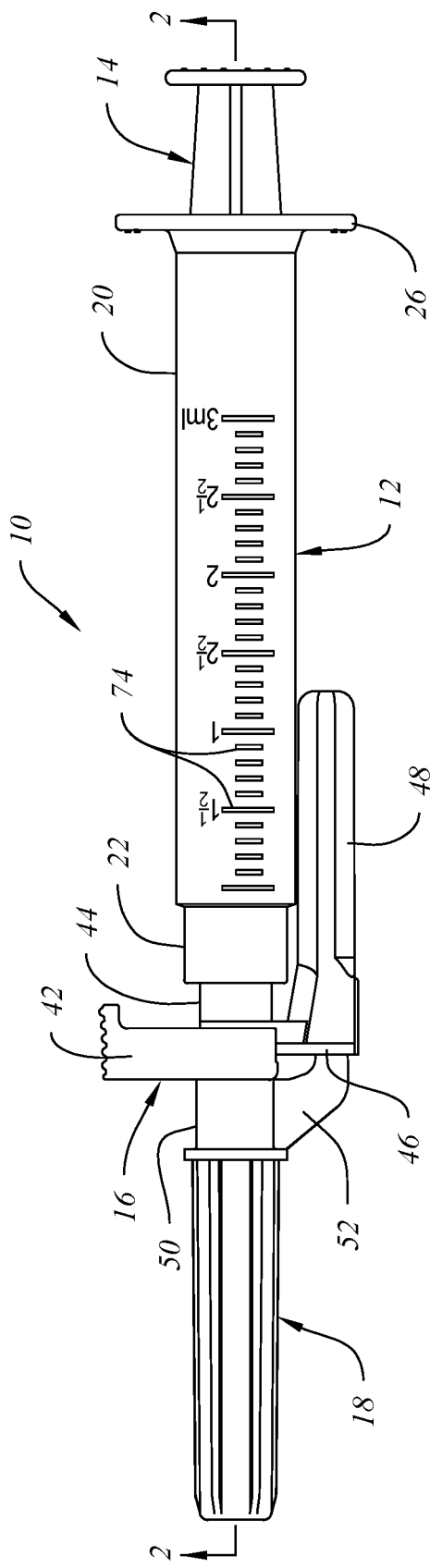
FIG. 1 is a top plan view of a preferred embodiment of the subject syringe in which the plunger handle is fully advanced inside the syringe barrel.
Figure 2:
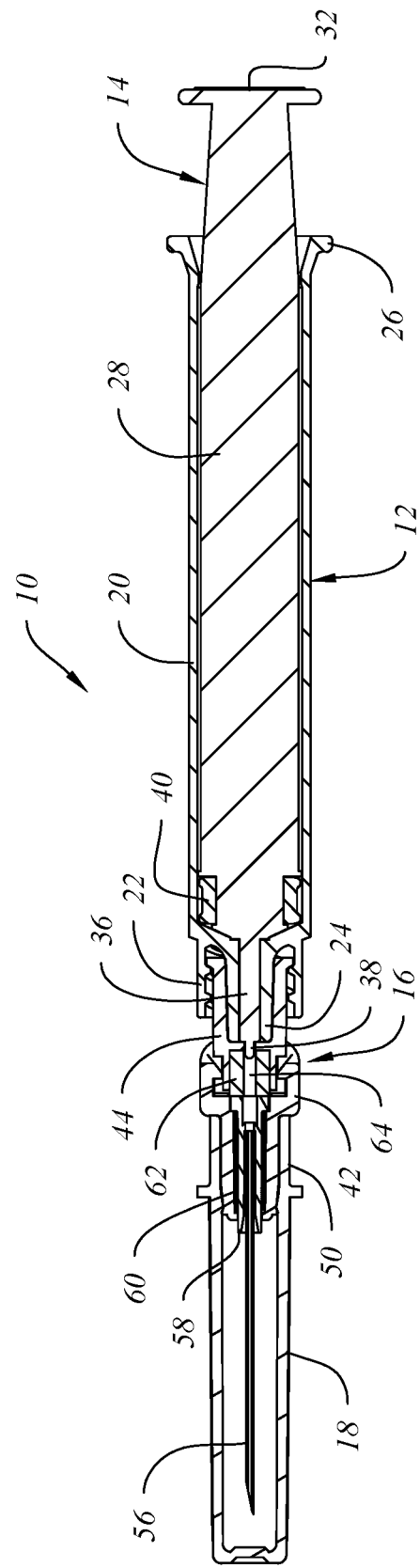
FIG. 2 is a cross-sectional view taken along line 2-2 of FIG. 1.
Figure 3:
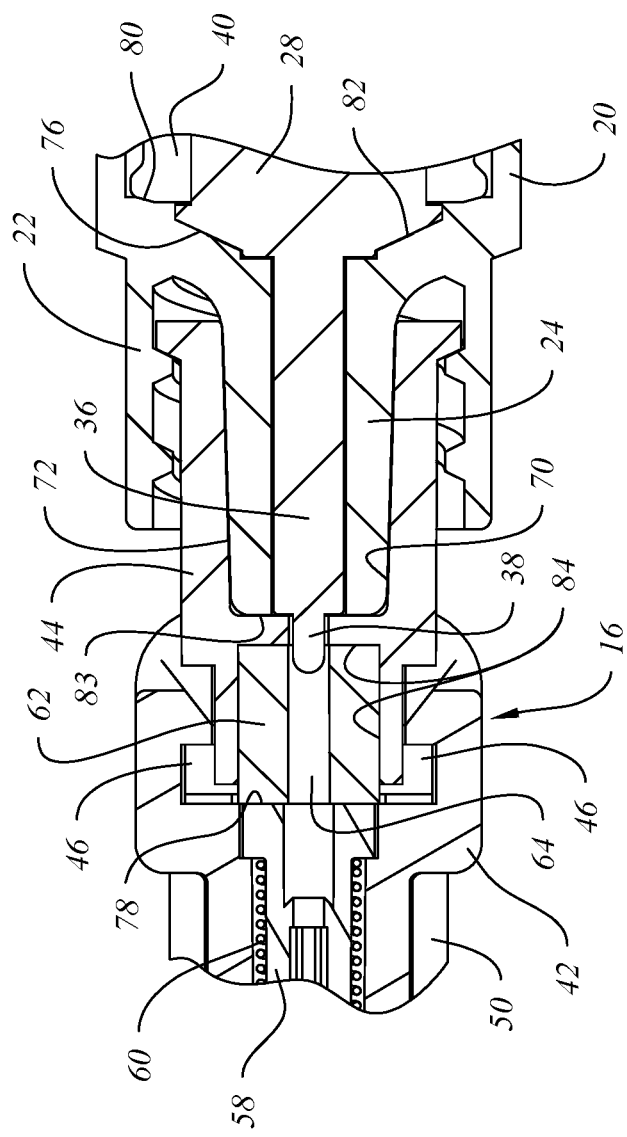
FIG. 3 is an enlarged detail view taken from FIG. 2.

Referring to FIG. 1, medical syringe 10 of the invention comprises barrel 12, plunger assembly 14, attachable needle assembly 16 and locking needle cover 18. Barrel 12 is desirably a unitarily molded plastic barrel such as those available in many different configurations and made of transparent or translucent plastic as well known in the art. In the embodiment shown, barrel 12 further comprises body 20, forwardly extending cylindrical collar 22, and radially extending finger flange 26 and molded or printed indicia 74 signifying incremental volumetric dosages up to 3 mL. Referring to FIGS. 2 and 3, cylindrical collar 22 is internally threaded and configured for threaded engagement with chamber luer 44, the rearwardly facing portion of which has a tapered inside slip-fit surface 70 (FIG. 3) adapted to provide fluid-tight seal with cooperating outwardly facing tapered surface 72 of nose 24 of barrel 12.

Figure 4:
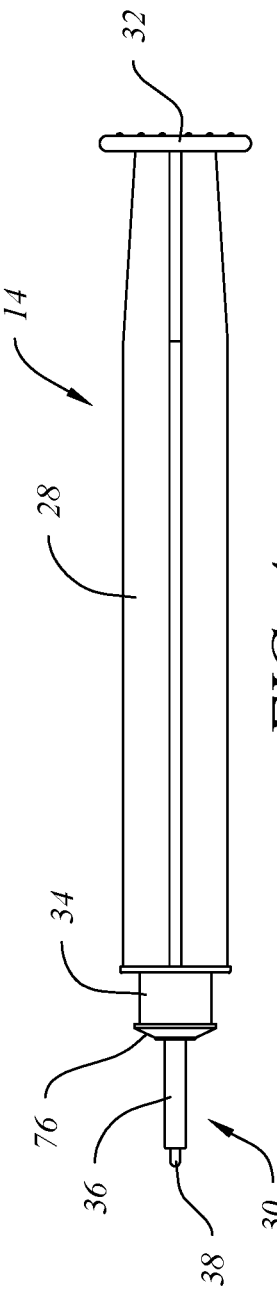
FIG. 4 is top plan view of the plunger handle of FIG. 1 prior to placement of the plunger seal of FIGS. 2 and 3 on the plunger seal seating surface of FIG. 4.

Referring to FIGS. 1-5, and particularly to FIG. 4, plunger assembly 14 further comprises unitarily molded, ribbed plastic plunger handle 28 having a rearwardly facing thumb cap 32, plunger seal seating surface 34 and front tip 30 comprising first section 36 and second section 38. Referring to FIGS. 2-3 and 5, plunger seal 40 is desirably an elastomeric annular seal seated on and frictionally engaging plunger seal seating surface 34 (FIG. 4). When plunger assembly 14 is inserted into the opening defined by finger flange 26 at the rear of barrel 12, plunger seal 40 desirably provides a fluid-tight seal with inwardly facing surface 65 of body 20 of barrel 12 as plunger handle 28 is advanced inside the barrel. Referring to FIG. 5, medical syringe 10 is depicted with the needle cover 18 (FIG. 2) removed, and with plunger assembly 14 partially inserted inside barrel 12. Fluid reservoir 66 is disposed inside barrel 12 between the front of plunger assembly 14 and communicates through coaxially aligned fluid pathway 64 inside nose 24 with coaxially aligned needle 56, which is seated inside and projects forwardly from needle assembly 16.

Referring to FIGS. 1-3, needle assembly 16 further comprises body 46, rearwardly projecting chamber luer 44 releasably attachable to the internally threaded luer connector of cylindrical collar 22 and slide member 42 that slidably engages both body 46 and chamber luer 44. Slide member 42 provides seating surfaces for needle holder 58, with forwardly projecting needle 56 and compressed needle retraction spring 60 disposed around a front portion needle holder 58. The forwardly facing portion of chamber luer 44 satisfactorily provides seating surfaces for an annular fluid seal 62 disposed between nose 24 of barrel 12 and rearwardly facing surface 78 of needle holder 58. Body 46 of needle assembly 12 further comprises a rearwardly extending needle retraction chamber 48 having a forwardly facing open end through body 46 that receives locking support arm 52 of needle cover 18 prior to use of medical syringe 10. Following removal of needle cover 18 from needle assembly 16 for use of medical syringe 10, the forwardly facing opening into needle retraction chamber 48 receives needle holder 58, needle 56 and expanded compression spring 60 during needle retraction (not shown but discussed below).

Slide member 42 is disposed in lateral sliding engagement with body 46. As seen in FIGS. 2-3, slide member 42 supports needle 56 disposed in needle holder 58 having a central bore coaxially aligned with fluid pathway 64 through annular fluid seal 62. Needle retraction spring 60 is compressed behind the head portion of needle holder 58 and provides the motive force for driving needle holder 58 and needle 56 rearwardly into needle retraction chamber 48 when slide member 42 is repositioned laterally following an injection or blood draw. Annular fluid seal 62 is seated in and supported by a cylindrical recess 84 provided in the forwardly facing portion of chamber luer 44.

As seen in FIG. 1, medical syringe 10 is shown in a pre-use condition in which needle cover 18 is disposed over the needle prior to administering an injection. Locking arm 52 extending laterally from releasable attachment collar 50 of needle cover 18 is inserted through an opening into the front of needle retraction chamber 48 to prevent slide member 42 from moving laterally relative to syringe barrel 12 prior to use. To prepare syringe 10 for use (as shown in FIG. 5), needle cover 18 is removed and needle 56 is inserted into a medicine vial (not shown) to draw a dose appropriate for injection. Plunger assembly 14 is withdrawn rearwardly relative to barrel 12 until the proper fluid level is reached as indicated by indicia 74 on body 20 of barrel 12. The injection is then administered by inserting needle 56 into a patient and applying forwardly directed thumb force to thumb cap 32 while using finger flanges 26 to resist the applied thumb force and hold the syringe steady relative to the patient. Following the injection, slide member 42 is desirably moved laterally to reposition needle 56 and needle holder 58 into alignment with needle retraction chamber 48, thereby allowing the compressed retraction spring 60 to expand and force the contaminated needle 56 rearwardly to a position where it is no longer exposed and cannot accidentally stick the patient or caregiver administering the injection.

As shown in relation to FIGS. 2-4 and made possible by the present invention, when plunger handle 28 is advanced forwardly inside barrel 12 to the position shown in FIGS. 2 and 3 during an injection (after needle cover 18 has been removed as described above), front tip 30 of plunger handle 28 enters nose 24 of barrel 12 and displaces the medicinal fluid being injected forwardly out of that space, through fluid pathway 64 of annular fluid seal 62 and into needle 56. As plunger seal 40 of plunger handle 28 contacts an opposed stop surface 80 at the front of body 20 of barrel 12, forwardly facing surface 76 of plunger handle 28 desirably contacts cooperatively configured stop surface 82 in the transition area between body 20 and nose 24 of barrel 12. Concurrently, first portion 36 of front tip 30 desirably reaches front 83 of nose 24, and second portion 38 of front tip 30 desirably extends forwardly beyond first portion 36 and into the rearwardly facing opening of fluid pathway 64 through annular fluid seal 62. This causes more medicinal fluid to be displaced forwardly into needle 56, thereby further reducing the "dead space" inside the syringe. When second portion 38 of front tip 30 is sized and configured to frictionally engage a portion of the interior surface disposed around fluid pathway 64 near the rear of fluid seal 62, second portion 38 also desirably assists in holding or anchoring fluid seal 62 in place inside recess 84 in the forwardly extending end of chamber luer 44 when needle 56 and needle holder 58 are repositioned laterally into alignment with needle retraction cavity 48 by slide member 42 during needle retraction.

As previously mentioned above, medical syringe 10 also has utility for use in withdrawing a bodily fluid such as blood through venipuncture needle 56 and into fluid reservoir 66 as seen in FIG. 5. When medical syringe 10 is used for this purpose, it can be desirable to have inside surface 65 of body 20 of barrel 12 coated with a layer 68 comprising an anticoagulant, antioxidant, or other beneficial medicament.

Other alterations and modifications of the preferred apparatus of the subject invention will likely become apparent to those of ordinary skill in the art upon reading this disclosure in relation to the accompanying drawings, and the present invention is intended to be limited only by the broadest reasonable interpretation of the appended claims when construed in accordance with the specification. For example, where medical syringe 10 is intended for use in drawing blood, a filter can be provided within the fluid flow path to further reduce the likelihood of air entrainment and partial oxidation of the drawn sample prior to use.

What is claimed is:

1. A medical syringe, comprising:
   a barrel comprising a nose and a first portion of a fluid pathway formed through the nose;
   a chamber luer coupled to a nose of the barrel and comprising a recess formed in a forward-facing portion of the chamber luer, wherein the recess comprises a second portion of the fluid pathway formed through the chamber luer, having a smaller diameter than the first portion of the fluid pathway, and in fluid communication with the first portion of the fluid pathway formed through the nose of the barrel;
   an annular seal seated in the recess formed in the forward-facing portion of the chamber luer and comprising a third portion of the fluid pathway extending through the annular seal, having a smaller diameter than the first portion of the fluid pathway, and in fluid communication with the second portion of the fluid pathway formed through the recess of the chamber luer and the first portion of the fluid pathway formed through the nose of the barrel;
   a needle assembly coupled to the barrel and comprising a needle holder and a needle; and
   a plunger assembly comprising a plunger handle, a plunger seal, and a front tip extending forwardly of the plunger seal, wherein the front tip comprises a first cylindrical portion that extends through the first portion of the fluid pathway formed through the nose of the barrel, and wherein the front tip comprises a smaller diameter second cylindrical portion that extends forwardly from the first portion to a distal end of the front tip, beyond the nose of the barrel, through the second portion of the fluid pathway formed through the recess of the chamber luer, and into the third portion of the fluid pathway extending through the annular seal when the plunger assembly is fully advanced inside the barrel, thereby reducing dead space inside the medical syringe ahead of the plunger seal.

2. The medical syringe of claim 1, wherein the medical syringe is configured to infuse a medicinal fluid into a user.

3. The medical syringe of claim 1, wherein the medical syringe is configured to withdraw a bodily fluid from a user.

4. The medical syringe of claim 1, wherein the needle assembly comprises a body and a slide member slidably engaging the body and providing seating surfaces for the needle holder.

5. The medical syringe of claim 4, wherein the body comprises a forwardly facing opening communicating with a needle retraction chamber extending rearwardly in parallel relation to the barrel.

6. The medical syringe of claim 5, further comprising: a compressed needle retraction spring seated inside the slide member.

7. The medical syringe of claim 1, wherein the barrel comprises a forwardly facing, internally threaded cylindrical collar, and wherein the nose is tapered and projects forwardly through the forwardly facing, internally threaded cylindrical collar.

8. The medical syringe of claim 7, wherein the chamber luer is releasably attachable to the forwardly facing, internally threaded cylindrical collar.

9. The medical syringe of claim 4, wherein the slide member is selectively moveable from a first position where the needle is coaxially aligned with the barrel to a second position where the needle is coaxially aligned with a needle retraction chamber.

10. The medical syringe of claim 9, wherein a compressed needle retraction spring seated inside the slide member provides a motive force to drive the needle holder and the needle rearwardly into the needle retraction chamber when the slide member is selectively moved to the second position.

11. The medical syringe of claim 1, wherein the smaller diameter second cylindrical portion of the front tip of the plunger assembly assists in anchoring the annular fluid seal inside the recess in the chamber luer when the needle assembly is repositioned laterally into alignment with a needle retraction cavity by a slide member.

12. The medical syringe of claim 1, wherein the distal end of the front tip comprises a diameter that is the same as or smaller than the smaller diameter second cylindrical portion of the front tip of the plunger assembly.

13. The medical syringe of claim 1, wherein the distal end of the front tip is rounded.

14. A medical syringe useful for infusing a medicinal fluid into a patient or a port in a fluid delivery system, the medical syringe comprising in coaxial alignment:
    a barrel;
    a plunger comprising a plunger seal slidably engaging an inside wall of the barrel to define a fluid reservoir inside the barrel;
    a needle assembly coupled to the barrel and comprising a chamber luer, a needle holder, a needle in fluid communication with the fluid reservoir inside the barrel, and an annular fluid seal disposed in a forward-facing recess formed in the chamber luer and seated against a rear surface of the needle holder;
    wherein the plunger comprises a plunger tip projecting forwardly of the plunger seal, wherein the plunger tip comprises a first cylindrical portion extending through a first portion of a fluid flow path formed through a nose portion of the barrel, wherein the plunger tip comprises a smaller diameter second cylindrical portion extending forwardly from the first cylindrical portion to a distal end of the plunger tip, beyond the nose portion of the barrel, through a second portion of the fluid flow path formed through the chamber luer, and into a third portion of the fluid flow path extending through the annular fluid seal when the plunger is fully advanced inside the barrel, wherein each of the second portion and the third portion of the fluid flow path comprises a smaller diameter than the first portion of the fluid flow path, and wherein the plunger tip and the plunger seal are cooperatively configured to displace sufficient fluid disposed inside the barrel to reduce dead space inside the medical syringe in comparison to a syringe not having the plunger tip.

15. The medical syringe of claim 14, wherein the smaller diameter second cylindrical portion of the plunger tip of the plunger assists in anchoring the annular fluid seal inside the forward-facing recess formed in the chamber luer when the needle assembly is repositioned laterally into alignment with a needle retraction cavity by a slide member.

16. A medical syringe useful for withdrawing a bodily fluid from a patient, the medical syringe comprising in coaxial alignment:
   a barrel comprising a nose;
   a plunger comprising a plunger seal slidably engaging an inside wall of the barrel to define a fluid reservoir inside the barrel;
   a needle assembly coupled to the nose of the barrel and comprising a chamber luer, an annular fluid seal disposed in a forward-facing recess of the chamber luer, a needle holder, a needle in fluid communication with the fluid reservoir inside the barrel through a fluid flow path that extends through the needle holder, the annular fluid seal, the chamber luer, and the nose of the barrel; and
   wherein the plunger comprises a plunger tip projecting forwardly of the plunger seal, wherein the plunger tip comprises a first cylindrical portion extending through a first portion of the fluid flow path extending through the nose of the barrel, wherein the plunger tip comprises a smaller diameter second cylindrical portion extending forwardly from the first portion to a distal end of the plunger tip, through a second portion of the fluid flow path extending through the chamber luer and beyond the nose of the barrel, and into a third portion of the fluid flow path extending through the annular fluid seal in fluid communication with a fourth portion of the fluid flow path extending through the needle holder when the plunger is fully advanced inside the barrel, wherein each of the second portion and the third portion of the fluid flow path comprises a smaller diameter than the first portion of the fluid flow path and the first cylindrical portion of the plunger tip, and wherein the plunger tip and the plunger seal are cooperatively configured to reduce air entrainment and air bubble formation inside the medical syringe as the bodily fluid is withdrawn into the fluid reservoir in comparison to a syringe not having the plunger tip.

17. The medical syringe of claim 16, further comprising: a medicinal substance disposed inside the barrel to condition the bodily fluid withdrawn into the fluid reservoir.

18. The medical syringe of claim 17, wherein the medicinal substance is selected from the group consisting of anticoagulants and antioxidants.

19. The medical syringe of claim 16, wherein the smaller diameter second cylindrical portion of the plunger tip of the plunger assists in anchoring the annular fluid seal inside the forward-facing recess formed in the chamber luer when the needle assembly is repositioned laterally into alignment with a needle retraction cavity by a slide member.

* * * * *